United States Patent
An et al.

(10) Patent No.: US 10,805,873 B2
(45) Date of Patent: Oct. 13, 2020

(54) FUNCTION SELECTION IN MOBILE NETWORKS

(71) Applicant: Huawei Technologies Co., Ltd., Shenzhen (CN)

(72) Inventors: Xueli An, Munich (DE); Chan Zhou, Munich (DE); Riccardo Guerzoni, Munich (DE); Riccardo Trivisonno, Munich (DE); Alexandros Kaloxylos, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

(21) Appl. No.: 16/104,785

(22) Filed: Aug. 17, 2018

(65) Prior Publication Data

US 2018/0359688 A1 Dec. 13, 2018

Related U.S. Application Data

(63) Continuation of application No. PCT/EP2016/053537, filed on Feb. 19, 2016.

(51) Int. Cl.
| | |
|---|---|
| *H04W 48/00* | (2009.01) |
| *H04W 76/00* | (2018.01) |
| *H04L 1/00* | (2006.01) |
| *H04L 12/46* | (2006.01) |
| *H04W 48/12* | (2009.01) |
| *H04W 76/10* | (2018.01) |

(Continued)

(52) U.S. Cl.
CPC .......... *H04W 48/17* (2013.01); *H04W 48/10* (2013.01); *H04W 48/12* (2013.01); *H04W 74/006* (2013.01); *H04W 76/10* (2018.02)

(58) Field of Classification Search
CPC ... H04W 48/17; H04W 48/12; H04W 74/006; H04W 48/10; H04W 76/10
See application file for complete search history.

(56) References Cited

U.S. PATENT DOCUMENTS

| | | | | |
|---|---|---|---|---|
| 2015/0092528 A1* | 4/2015 | Luo | ....................... | H04L 1/0025 370/210 |
| 2016/0073327 A1* | 3/2016 | Clougherty | ......... | H04L 12/4633 370/254 |
| 2018/0332632 A1* | 11/2018 | Vikberg | ................ | H04W 76/10 |

FOREIGN PATENT DOCUMENTS

| | | |
|---|---|---|
| WO | 2015084767 A1 | 6/2015 |
| WO | 2016188548 A1 | 12/2016 |

OTHER PUBLICATIONS

Alcatel-Lucent, Nokia Networks, "Non-IP data via SCEF Open Issues," S2-161080, Sep. 2016, 7 pages.

(Continued)

*Primary Examiner* — Kiet Tang
(74) *Attorney, Agent, or Firm* — Slater Matsil, LLP

(57) ABSTRACT

A set of functions, which comprises one or more access function and at least one network function, is provided in a telecommunication network. The telecommunication network is configured to provide compositions of functions based on the access function and the network function. Each composition of functions is uniquely identified by an identifier. The telecommunication network is further configured to provide to a terminal equipment one or more composition of functions based on the access function and the network function. The telecommunication network is further configured to make available the identifier of each composition of functions to the terminal equipment.

20 Claims, 12 Drawing Sheets

(51) Int. Cl.
*H04W 48/10* (2009.01)
*H04W 74/00* (2009.01)

(56) References Cited

OTHER PUBLICATIONS

Rachid El Hattachi, et al., "NGMN 5G White Paper," Feb. 17, 2015, XP055242573, 128 pages.
"Update the network slicing use case in SMARTER", ZTE Corporation, 3GPP TSG SA WG1 Meeting #71, S1-152074, 8.1, Belgrade, Serbia, Aug. 17-21, 2015, 3 pages.
"Solutions for Key Issue 1(Support of Network Slicing)", China Mobile, SA WG2 Meeting #113AH, S2-161081, Sophia Antipolic, France, Feb. 23-26, 2016, 6 pages.
"Solution to support a UE with simultaneous connections to multiple Network Slices", NTT DOCOMO:3GFP Draft, SA WG2 Meeting #113AH, S2-161043, NexGen/6.10, Sophia Antipolis, France, Feb. 23-26, 2016, 4 pages.
Shoji, et al., "Bring Your Own Network—A network management technique to mitigate the impact of signaling traffic on network resource utilization," 2014 IEEE 11th Consumer Communications and Networking Conference (CCNC), Jul. 28, 2014, 6 pages.
Taleb, et al., "Lightweight Mobile Core Networks for Machine Type Communications," IEEE Access ( vol. 2 ), Sep. 22, 2014, 10 pages.
"3rd Generation Partnership Project;Technical Specification Group Services and System Aspects; Feasibility Study on New Services and Markets Technology Enablers; Stage 1(Release 14)," 3GPP TR 22.891 V1.3.2, (Feb. 2016), 95 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.5,0, (Dec. 2015), 337 pages.
"3rd Generation Partnership Project; Technical Specification Group Services and System Aspects; Architecture Enhancements for Dedicated Core Networks;Stage 2 (Release 13)," 3GPP TR 23.707 V13.0.0, (Dec. 2014), 39 pages.
"3rd Generation Partnership Project; Technical Specification Group Services and System Aspects; Network Sharing; Architecture and functional description (Release 13)," 3GPP TS 23.251 V13.1.0, (Mar. 2015), 39 pages.
3rd Generation Partnership Project; Technical Specification Group Radio Access Network; Evolved Universal Terrestrial Radio Access (E-UTRA); User Equipment (UE) procedures in idle mode (Release 13), 3GPP TS 36.304 V13.0.0, December. (Dec. 2015), 42 pages.
"3rd Generation Partnership Project; Technical Specification Group Radio Access Network; Feasibility study for evolved Universal Terrestrial Radio Access (UTRA) and Universal Terrestrial Radio Access Network (UTRAN) (Release 13)," 3GPP TR 25.912 V13.0.0, (Dec. 2015), 64 pages.
"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13)," 3GPP TS 29.274 V13.4.0, (Dec. 2015), 341 pages.
"3rd Generation Partnership Project;Technical Specification Group Radio Access Network;Evolved Universal Terrestrial Radio Access (E-UTRA); Radio Resource Control (RRC);Protocol specification (Release 13)," 3GPP TS 36.331 V13.0.0, (Dec. 2015), 507 pages.
3rd Generation Partnership Project;Technical Specification Group Radio Access Network;Radio Resource Control (RRC); Protocol specification (Release 13), 3GPP TS 25.331 V13.1.0, (Dec. 2015), 2266 pages.
"3rd Generation Partnership Project;Technical Specification Group Core Network and Terminals; General Packet Radio System (GPRS) Tunnelling Protocol User Plane (GTPv1-U) (Release 13)," 3GPP TS 29.281 V13.0,0, (Sep. 2015) 28 pages.
Li, Qian (Clara) et al., "An end-to-end network slicing framework for 5G wireless communication systems," ETSI Workshop on Future Radio Technologies—Air Interfaces, Jan. 27, 2016, 13 pages.

* cited by examiner

FUNCTION SELECTION IN MOBILE NETWORKS

CROSS-REFERENCE TO RELATED APPLICATIONS

This application is a continuation of International Application No. PCT/EP2016/053537, filed on Feb. 19, 2016, which application is hereby incorporated by reference in its entirety.

TECHNICAL FIELD

The present invention relates to the technical field of telecommunication networks. Particularly, the invention relates to a telecommunication network, a terminal equipment and a method for providing a network service to a terminal equipment.

BACKGROUND

According to the industry consensus, the 5th Generation mobile technology (5G) will be standardized and deployed by the year 2020. Compared to the 4G mobile telecommunication system, 5G may support use cases with very high variety in terms of performance attributes, for instance ultra-reliable communications for mission critical services, eHealth, public safety, real-time vehicle control, tactile Internet, connectivity for drones, and so on.

According to 3GPP (see 3GPP TR22.891, "Feasibility Study on New Services and Markets Technology Enablers; Stage 1, Release 14), a network slice is composed of a collection of logical network functions that supports the communication service requirements of particular use case(s). The network slicing primarily targets a partition of the core network, but it is not excluded that RAN may need specific functionality to support multiple slices or even partitioning of resources for different network slices.

NGMN (Next Generation Mobile Networks, see NGMN Alliance, "5G White Paper", Feb. 17, 2015) aligns with 3GPP defined network slice. NGMN defines that, 5G network slice supports the communication service of a particular connection type with a specific way of handling the Control plane (C-plane) and User plane (U-plane) for this service (User plane is synonymous of Data plane in this context).

In the current mobile networks, e.g. 4G LTE system, the core network has a static architecture, as described in 3GPP TS 23.401 V13.2.0, "General Packet Radio Service (GPRS) enhancements for Evolved Universal Terrestrial Radio Access Network (E-UTRAN) access". Network C-plane and U-plane functions are provided by fixed network elements like Mobility Management Entity (MME), Serving Gateway (SGW), PDN Gateway (PGW), etc. These network elements serve all the traffic that passes through the Evolved Packet Core (EPC) regardless the types of services.

Dedicated core networks (DÉCOR) concept is proposed in 3GPP TR 23.707, rel. 13, "Architecture enhancements for dedicated core networks", in which it defines that except for one common core network, one or more dedicated core networks can co-exist within a Public Land Mobile Network (PLMN) with each core network dedicated for specific type(s) of subscribers. The specific dedicated core network that serves an end device is selected based on subscription information and operator configuration. This design is still a static way to provision network functions.

The above 3GPP activity tackles enabling dedicated core networks within the same PLMN, meaning, the same operator. The 3GPP activity described in 3GPP TS 23.251, V13.1.0, "Network sharing; Architecture and functional description" (3GPP TS 23.251) tackles how to allow different core networks belonging to different operators to connect to a shared radio access network. There are two approaches defined. The first one is the Multi-Operator Core Network (MOCN) approach, which defines that multiple CN nodes are connected to a single Radio Network Controller (RNC). The second approach is called as the Gateway Core Network (GWCN) approach, which is contrary to MOCN, MME is also shared between different operators.

Y. Shoji, M. Ito, K. Nakauchi, L. Zhong, Y. Kitatsuji and H. Yokota, "Bring your own network—A network management technique to mitigate the impact of signaling traffic on network resource utilization", in proc. of IEEE CCNC, pp. 182-187, January 2014 also refers to dedicated networks. This work defines that any type of service could start on the common layer, and then some of the communication flows for a specific service could handover to the service-specific layer if necessary. Therefore, layer selection is based on handover from common layer to service-specific layer mechanism. Mobile traffic dispatching to different CN is done at base stations (BSs). BSs are virtualized into several instances, for instance one BS instance is used to server traffic for common layer, and several service-specific BS instances are used to service traffic for dedicated layers. They use virtualization capable base station switch to enable handover between layers.

T. Taleb, A. Ksentini and A. Kobbane, "Lightweight mobile core net-works for machine type communications," IEEE Access, vol. 2 pp. 1128-1137, September 2014 proposes to use dedicated core networks to process Machine Type Communication (MTC) services. BSs detect service types via a new MTC Service Type Detection Function (MTC-STDF).

3GPP TS 36.304 V12.6.0, "Equipment (UE) procedures in idle mode (Release 12)" describes network function allocation in a SDN-based (SDN: software defined networking) cloud infrastructure. This document further describes the process of cell re-selection within a cellular network.

SUMMARY

There may be a need within the described background to refer to the problem of enabling end to end (E2E) slice selection and attachment in 5G systems, to be performed according to operational, performance and functional requirements of the requested service and/or of the attaching end device, e.g. flexibility and scalability.

It has been recognized that in order to support services with a diverse range of requirements, network slicing concept is expected to be one of the key building blocks of 5G networks according to the recent agreements within standardization forums. It enables a service-tailored network function provisioning scheme, which aims especially at vertical industries integration.

Generally, a network slice is composed of a collection of 5G network functions and specific Radio Access Technology (RAT) settings that are combined together for the specific use cases. The slice definitions focus on the slice end to end (E2E) feature, meaning, the slice provisioning is from the access networks (AN) to core networks (CN). Within the present invention, the most general definition of network slice is considered: slice is a collection of interconnected logical access network and core network functions to meet a diverse range of requirements.

Based on the system architecture of the current static networks, e.g. 4G LTE, it may not be possible to enable service-tailored network function provisioning. It has been recognized that in the present static networks, the network resources cannot be shared among different core networks within the same PLMN. The Non-Access Stratum (NAS) message redirection mechanism is used in DÉCOR to dispatch the NAS messages from a certain end device to the appropriated core network. For instance, the NAS message from an end device is directed from Evolved Node B (eNB) to an MME network entity. If such network entity is not dedicated to serve the subscriber type of this end device, the NAS message will be redirected to the dedicated network entity. Even though such redirection mechanism can dispatch NAS messages from different subscribers to different core networks, it prolongs the C-plane signaling latency, and also increases C-plane overhead. Moreover, resource separation via DÉCOR is only enabled within the Core Network (CN), meaning, all the subscribers share the same resource in the Radio Access Network (RAN). The problem of this is, for instance, end devices require high performance attributes (e.g. ultra low latency or ultra high reliability) cannot be distinguished from end devices with low performance attributes (e.g. low-cost sensors).

According to an aspect of the invention, a telecommunication network is provided, comprising: a set of functions which comprises at least one access function and at least one network function, wherein the telecommunication network is configured to provide compositions of functions based on at least one access function and at least one network function, and each composition of functions is uniquely identified by an identifier, wherein the telecommunication network is further configured to provide to a terminal equipment at least one composition of functions based on at least one access function and at least one network function, wherein the telecommunication network is further configured to make available the information of the at least one composition of functions to the terminal equipment, wherein the information of the at least one composition of functions comprises identifier of each composition of functions of the at least one composition of functions, wherein the telecommunication network is further configured to receive a request for using at least one composition of function from the terminal equipment, wherein the telecommunication network is further configured to respond to the request from the terminal equipment.

Said composition of functions may be described as a slice. Referring to the previous definition of E2E slice to be supported by 5G systems, comprising both access network functions and core network functions, this application proposes a novel end device triggered and network controlled E2E slice selection mechanism, based on which end devices (or terminal equipment, which terms are equal for the scope of the present application) can attach to the desired slice or slices. The 5G system access points (APs) broadcast slice related information, e.g. performance and/or functional capabilities, within their coverage. The E2E slice selection is triggered by the end devices once they receive the broadcasted slice information from the APs. The E2E slice selection mechanism is steered and completed by the network during the slice attachment procedure, which will be described below in more detail.

This application proposes and enables E2E slices that cover from radio access to core network, and correspondingly, there is a mechanism that end devices can select an E2E slice in a flexible and scalable way and attach to an end to end slice. In the related work and contrary to the approach described herein, selection and attachment all happened at access nodes (e.g. eNBs) or beyond (e.g. in core network) after the end device attaches to the network. Moreover, network slices (i.e. different core networks) mentioned in the above related work all refer to independent network infrastructure, which are fixed in terms of deployed resources and provisioned network functions. In order to overcome the above mentioned drawbacks of the prior art and according to a recognition, this application proposes to enable the notion of E2E slices by broadcasting the slice related information to end devices, therefore end devices can directly select and attach to their preferred slices. This approach may have advantages in terms of minimizing C-plane signaling exchange, not overloading the network with unnecessary attach procedures, minimizing the delay by have an end device being attached to the wrong slice etc.

The telecommunication network described herein may be configured to transmit information about the functions of each one of the more than one composition of functions (slices) to a terminal equipment. For example the information about the slices may contain the type of service, quality of service parameter, etc. The telecommunication network can be any kind of data transmission network, in particular mobile communication network which comprises access points for being connected to terminal equipments and a core network which may consist of multiple core network nodes.

The terminal equipment may choose a composition of function to connect to based on the information about the functions of each one of the more than one composition of functions. In other words, the composition of functions may be referred to as a logical telecommunication network which is customized to specific needs of a specific terminal equipment or groups of terminal equipments; thus, any terminal equipment may select one composition of functions according to its specific requirements and needs.

A slice may in particular be intended to be an end-to-end slice. The access function and the network function may be implemented on different network nodes or they may be implemented as virtual functions on the same network node. For example, in a minimum hardware configuration of the network, there may be two access points connected to each other and a slice is composed from one function of each one of the network nodes, respectively. In general and for exemplary purpose only, to provide different slices, it suffices to have a first network node (1) with different functions (a; b) while a second network node (2) can have one function (a) only. Thus, different slices (1a-2a) or (1b-2a) could be created and provided to terminal equipments. Note: the letter "a" with respect to the functions of the first and second network nodes does not indicate that these functions correspond to each other! The letters a and b used for the functions are merely variables. A network function can be a function or a role of the network node in the telecommunication network, wherein the function/role is at least in part involved in the telecommunication network tasks like data transmission and service provision.

An access function is a component of a telecommunication network performing actions to provide connectivity from the terminal equipment to the access point. Said access function may be a logical function or a function implemented within a computerized device or within an element of such a device.

A network function is a component of a telecommunication network performing actions to provide connectivity to the terminal equipment beyond the access point. As the access function, the network function may also be a logical function or a function implemented within a computerized device or within an element of such a device.

The telecommunication network may comprise a physical infrastructure which comprises the basic physical components for building a mobile telecommunication network, including wireless access nodes, core network nodes, Data Centers, Edge Data Centers or Points of Presence; these components are typically interconnected by at least one data transmission or transport network. The information about network functions is used by the terminal equipment to tune their radio interfaces (radio access technology, RAT, like waveform, coding schemes, modulation) and to obtain characteristics of a composed network function (like end-to-end performance, functional information) and access the telecommunication network, for example a cellular network. The telecommunication network may host more than one and different compositions of functions, while each and any of the different compositions of functions share a common physical infrastructure; in particular, the compositions of functions share a radio access interface dedicated to the broadcasting of the unique identifier of a composition of functions.

Summing up, information about the slices is sent to terminal equipments by the telecommunication network, before a terminal equipment connects to the respective slice or slices. Thus, each terminal equipment can determine which of the available slices to use and can attach to the selected slice. This approach enables simple and efficient slice selection from the perspective of the terminal equipment.

According to an embodiment of the invention, the telecommunication network is further configured to select for each composition of functions it provides a radio access technology, RAT, by selecting a modulation scheme from modulation schemes supported by air interfaces of the telecommunication network, and/or a coding scheme from coding schemes supported by the air interfaces of the telecommunication network, and/or a frequency from frequencies supported by the air interfaces of the telecommunication network, and/or a waveform for data signal transmission from waveforms for data signal transmission supported by the air interfaces of the telecommunication network, wherein the information of the at least one composition of functions comprises the selected modulation scheme, coding scheme, frequency or wave form for data signal transmission.

According to a further embodiment of the invention, the telecommunication network is further configured to respond to the request by executing one of the following actions: accepting the request to attach to the composition of functions, rejecting the request to attach to the composition of functions, or redirecting the request to another composition of functions.

According to a further embodiment of the invention, the telecommunication network is further configured to redirect the request to another composition of functions by determining if the requested composition of functions has sufficient resources to establish a connection to the terminal equipment and by sending to the terminal equipment a unique identifier of an alternative composition of functions if the requested composition of functions does not have sufficient resources to establish the connection to the terminal equipment.

Whether or not a slice has sufficient resources may be determined based on the number of already connected terminal equipments or based on the load (amount of data transmitted, for example) of any slice. Thus, in case of an overloaded slice and there is an alternative slice that can be used, the terminal equipment is presented the alternative to its originally requested slice such that a quick provision of service can be established.

According to a further embodiment of the invention, the set of functions comprises at least one of the following access functions: physical access of the terminal equipment to the first and second network nodes; radio connection management; and at least one of the following network functions: forwarding path management; address resolution; address allocation; tracking area management; paging management; handover management; relaying; data packet forwarding; authentication of the terminal equipment authorization of the terminal equipment; access stratum security management.

According to a further embodiment of the invention, a composition of functions comprises access functions and network functions needed for providing a predefined service.

According to a further embodiment of the invention, the telecommunication network comprises network nodes capable of at least one of computing, data storage and packet forwarding and configured to virtualize the functions.

According to a further embodiment of the invention, the telecommunication network comprises an authorization component configured to determine which of the compositions of functions are allowed to be used by the terminal equipment.

According to a further embodiment of the invention, the telecommunication network is configured to make available the information of the at least one composition of functions to the terminal equipment by broadcasting this information via an air interface of the telecommunication network in order for it to be received by an air interface of the terminal equipment.

According to a further embodiment of the invention, the telecommunication network is configured to provide a basic composition of functions which is allowed to be used by all terminal equipments.

This basic composition of functions can be referred to as a default configuration and may particularly be used by so called non-smart terminal equipments which are not capable to perform slice selection. Such non-smart devices use the basic composition of functions.

According to a further embodiment of the invention, the telecommunication network comprises a first network node configured to host a first function of the set of functions and a second network node configured to host a second function and a third function of the set of functions, wherein the second function and the third function are different functions, wherein the telecommunication network is configured to select one of the second and third functions of the second network node for creating the composition of functions together with the first function.

In this specific embodiment the set of functions are hosted on different physical network nodes (not as different virtual functions on the same node). However, it should be noted that the set of functions may be implemented as virtual functions on the same physical node.

According to a further embodiment of the invention, the telecommunication network may further comprise a third network node which is configured to host a fourth function of the set of functions, wherein the telecommunication network is configured to determine if the fourth function of the third network node is required for the composition of functions, wherein the telecommunication network is configured to create the composition of functions by adding the fourth function to the composition of functions.

The third network node is optional for the slice composition, i.e. the function hosted at the third network node may or may not be part of the composition of functions. A composition of functions may be created by using the network nodes' functions only if they are needed for the composition of functions. A terminal equipment may send a attach request to the telecommunication network and the telecommunication network may determine, based on the attach request, which composition of functions is needed for said request and in order to provide a service to the terminal equipment. Omitting unnecessary network functions from a composition of functions may reduce the overall load in the telecommunication network as non-required functions and network nodes are involved only in those processes where they are required.

According to a further embodiment of the invention, at least one of the first and second network node implements the function of a forwarding unit configured to forward data packets according to preconfigured data forwarding rules. This embodiment relates to the combination of the slices approach with SDN mechanisms.

According to a further aspect of the invention, a terminal equipment is provided which is configured to establish a communicative connection to a telecommunication network as described above, wherein the terminal equipment is further configured to receive unique identifier of one or more composition of functions from the telecommunication network and to select at least one of the one or more composition of functions by sending an attachment request to the telecommunication network.

The terminal equipment may be any kind of equipment which requires a service of the telecommunication network. A composed network function is provided to the terminal equipment custom fitted to the needs of the terminal equipment. The composed network function can be used by the terminal equipment like a logically separated network and for the purposes of said terminal equipment, only those network functions are involved in provision of service which are part of the composed network function. Thus, the load of the telecommunication network can be reduced as only those network nodes and network functions are involved in provision of service which are needed for said specific purpose.

According to an embodiment of the invention, the terminal equipment is further configured to make the selection of slices based on service requirements of applications running on the terminal equipment, or make the selection based on information preconfigured on the terminal equipment.

The selection of the slices may depends on at least one requirement (like quality of service, QoS, response time, available bandwidth, required services, etc.) of the applications running on the terminal equipment.

According to a further embodiment of the invention, the terminal equipment is further configured to attach to more than one compositions of functions of the one or more composition of functions by sending respective attachment requests to those more than one compositions of functions.

According to a further embodiment of the invention, the terminal equipment is configured to receive a redirection of the selection request and attach to the redirected composition of functions.

According to another aspect of the invention, a terminal equipment is provided which is configured to establish a communicative connection to a telecommunication network as described above and hereinafter, wherein the terminal equipment comprises a storage module which contains a predefined unique identifier of a composition of functions of the telecommunication network, wherein the terminal equipment is configured to use a service of the telecommunication network exclusively by using the composition of functions according to the unique identifier predefined in the storage module.

The terminal equipment of this aspect relates to a so called "non-smart" terminal, for example a sensor. Such a non-smart terminal is preconfigured and contains an identifier of a slice to use. The terminal equipment of this aspect may be a low-cost device, for example a sensor, which is configured to use specific functions of a mobile telecommunication network for transmitting measured values and optionally for receiving configuration commands. Such a low-cost device may require only specific functions or a specific bundle of functions which can be composed of specific network functions being particularly tailored to the needs and requirements of said terminal equipment.

According to a further aspect of the invention, a method for providing a network service to a terminal equipment by a telecommunication network is provided. The method may particularly be implemented on a software defined network, SDN, wherein the telecommunication network is capable of providing at least one compositions of functions, wherein each composition of functions is identified by a unique identifier, wherein the method comprises: transmitting, by the telecommunication network, to a terminal equipment, identifiers of all compositions of functions allowed to the terminal equipment, selecting and requesting, by the terminal equipment, at least one of the compositions of functions by referring to the unique identifier of the selected compositions of functions, and responding, by the telecommunication network, to the selecting and requesting of the at least one composition of functions.

The telecommunication network uses a transmission channel which particularly is a broadcasting channel in order to transmit the unique identifier of a slice to the terminal devices. Within this broadcasting channel, information about the mobile system, which is also called as "system information", is transmitted from base stations (access points) to the terminal equipment. Said "system information" may also carry the slice information, i.e. the information about the compositions of functions. Slice information may contain two components: a unique ID, which can be used to uniquely address a slice and performance and/or functional information (e.g. with mobility support, without mobility support), which provide extra information about a slice. Therefore, features like extensions of the system information as well as the air interface may be implemented in order to transmit the required information from the telecommunication network to the terminal equipment.

The method and the interaction between the telecommunication network and the terminal equipment may, in other words and for exemplary purpose only, be summed up as follows.

The method enables terminal equipments to select and attach to one or more logical telecommunication networks (slices) that are operated on a common physical infrastructure, wherein a logical telecommunication network may be composed by one or more access functions and one or more network functions and each one of logical telecommunication network is assigned with a unique identifier. This method comprises the steps: a) enabling multiple logical telecommunication networks at air interface of the physical infrastructure (this relates to amendments at the air interface); b) advertising logical telecommunication networks to terminal equipment, wherein the physical infrastructure is configured to transmit system information that contains information about one or more logical telecommunication networks to a terminal equipment; c) enabling the terminal equipment to select and attach to one or multiple logical telecommunication networks by referring to the respective unique identifier and/or based on the logical telecommunication network information contained in the system information and on terminal equipment capabilities; d) enabling a logical telecommunication network to accept/reject/redirect an attachment request from terminal equipment.

According to a further aspect of the invention, a network system is provided comprising a telecommunication network as described above and at least one terminal equipment as described above. In one embodiment, the telecommunication network and the at least one terminal equipment may operate according to the method as described above.

BRIEF DESCRIPTION OF THE DRAWINGS

Embodiments of the invention will be described with respect to the following figures, in which.

DETAILED DESCRIPTION OF ILLUSTRATIVE EMBODIMENTS

Figure 1:
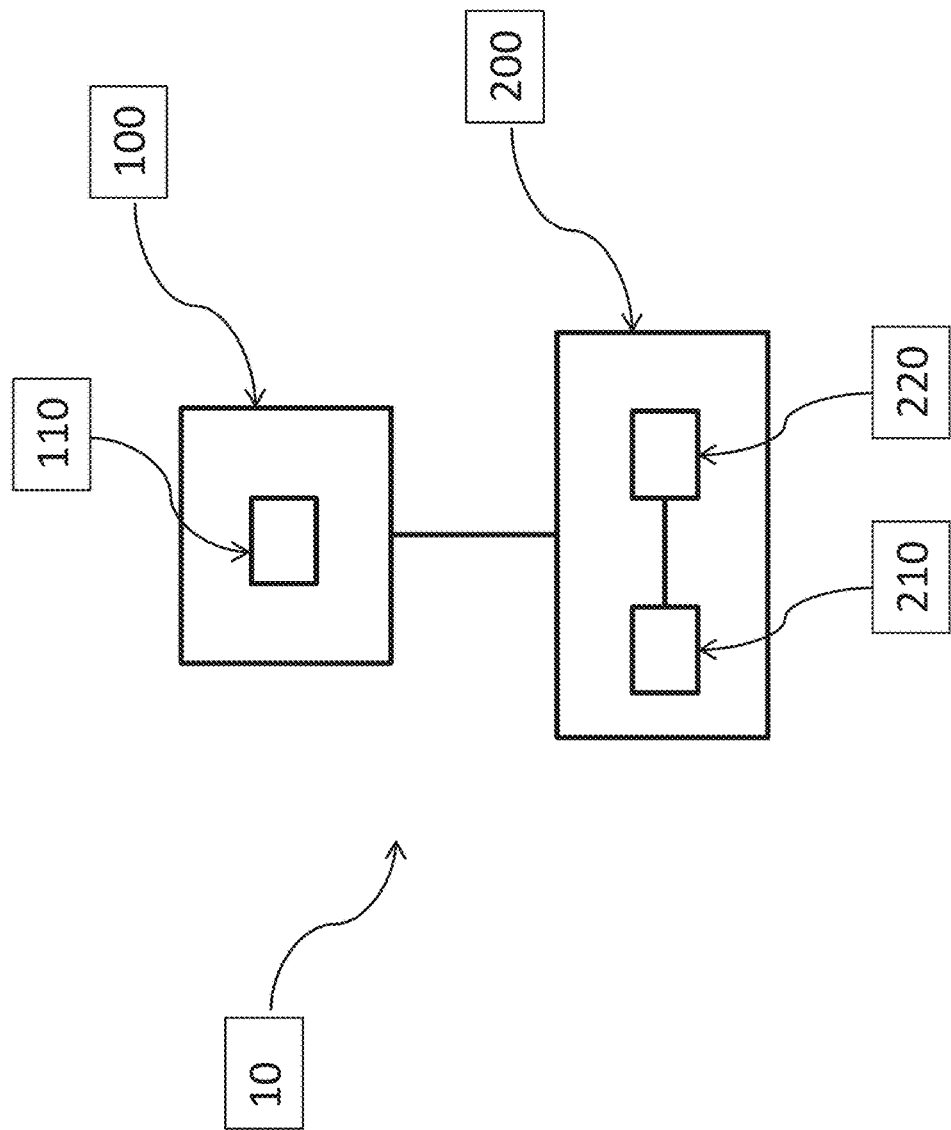
FIG. 1 schematically shows an SDN system according to an exemplary embodiment of the invention.

FIG. 1 provides an overview of the structure of an SDN system 10. The telecommunication network described herein and its functions may be implemented by using such an SDN system. The control plane 100 is separated from the data plane 200. The control plane 100 is formed by at least one control unit no which controls the configuration and the functioning of the data plane (or: user plane), in particular the configuration of forwarding units 210, 220 of the data plane.

The SDN system 10 and its components are configured to carry out the functions as described above with reference to the telecommunication network and the method for providing a network service to a terminal equipment by the telecommunication network.

Figure 2:
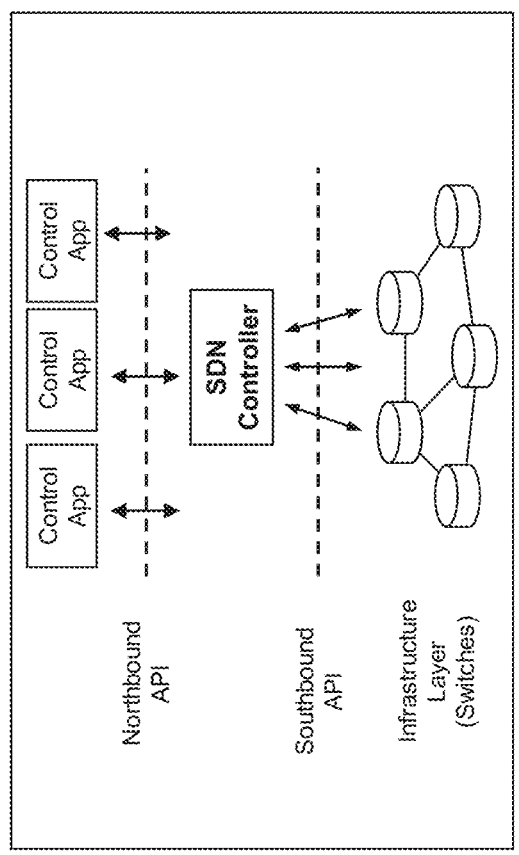
FIG. 2 schematically shows the SDN architecture.

While FIG. 1 describes the SDN system from a structural point of view, FIG. 2 describes the SDN system from a logical point of view.

Software defined networking (SDN) is an approach to network design and management that separates the control from the forwarding plane of the network and thus enables their independent evolution and centralizes the control plane, thus making the development of control plane protocols simpler and faster.

A component of an SDN network is an SDN controller. Through its southbound APIs, the controller communicates with the network elements (switches) and relays the necessary data to and from them to build a centralized view of the network state. Through its northbound APIs, it exposes that view to control applications, enabling them to execute their logic and manipulate the network state.

It should be noted that throughout this application the terms composition of functions and slice are used as synonyms. One aspect of the present application aims to enable the support of E2E slice in mobile networks and to provide mechanisms to let end devices (terminal equipments) to select and attach to one or multiple E2E slices. Such E2E slices can be dynamically deployed within the mobile networks. End devices can obtain slice related performance and functional capabilities advertised by the Access Points (APs) of the mobile network.

This application refers to the definition of E2E network slice provided above, and defines a mechanism enabling E2E slice selection and attachment based on the following steps:

1. Slice Information Advertisement: broadcasting, by an AP, information related to available slices. Such information could be performance and/or functional information of the available slices. This scheme allows end devices to know the list of available end to end slices with the related performance and functional characteristics, which can be used by the end devices to decide which slice(s) to select and attach to.

2. Slice Selection and Attachment Request: Based on the obtained slice information from an AP, an end device selects the most suitable slice to attach to and sends Attach Request to the network through the AP.

3. Slice Attachment Accept/Reject/Redirect: After the Attach Request is received by the AP and forwarded to one of the network functions which is responsible to process the request, the network function may decide to Accept/Reject/Redirect the request according to the end device's credential, resource availability and request redirection support.

The network architecture upon which the E2E slicing approach described herein may be either realized according to Network Function Virtualization (NFV) and Software Defined Networks (SDN) paradigms or rely on dedicated hardware appliances. The C-Plane and the U-plane for mobile telecommunication networks may be built upon virtual and/or physical infrastructures, including wireless access nodes, Data Centers, Edge Data Centers or Points of Presence, interconnected by a transport network realized either by legacy connectivity methods or by virtual links, virtual switches and virtual routers controlled by SDN controllers.

Figure 3:
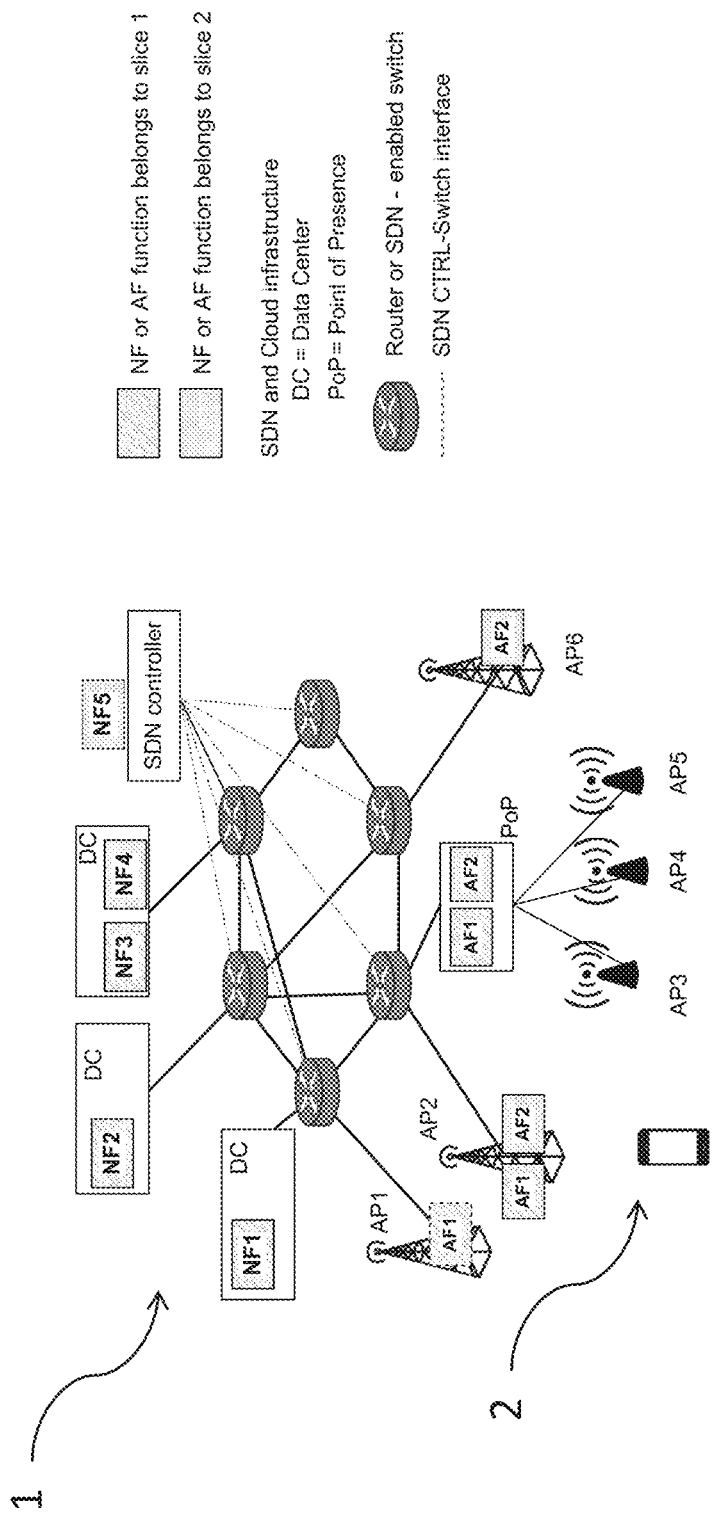
FIG. 3 schematically shows the composition of slices in a telecommunication network.

The C-plane may particularly be composed by a set of Control Applications, i.e. Access Functions (AF) and Network Functions (NF), as shown in FIG. 3, which are interconnected via logical interconnections. NFs can be either implemented as SDN control applications, which requires to interacts with SDN controller via dedicated APIs), or they can be implemented as software running on virtual machines in Data Centers (DC), edge Data Centers or Points of Presence (PoP) environment, where provides the computing and storage resources.

The APs can have computing and storage capability, e.g. eNB (evolved Node B), or it can also be remote radio head that only receives radio signals, performs some basic processing upon the received signals and forwards the received signals to the edge DC or PoP (where contains computing resource and not far away from the APs) for further signal related processing. For the former case, AFs can be integrated or co-located with the APs. For instance, AFs can be implemented as software and deployed in the virtual machines running in the APs. For the latter case that the APs do not have computing and storage capabilities, the AFs can be implemented as software and run in edge DCs or PoPs.

As shown in FIG. 3, the infrastructure is implemented by routers or forwarding elements controlled by SDN controllers.

Examples of Control Applications (App) are the following.

Access Function (AF) App, performing connection management actions, and possibly access network selection related actions;

Connection Management (CM) App, performing radio connection management, forwarding path management, DNS address resolution, address allocation to the user equipments;

Mobility Management (MM) App, performing user reachability, tracking area management, paging and handover management, relaying;

Forwarding Management (FM) App, performing packet routing configuration for the data plane;

Authentication and Authorization (AA) App, performing authentication and authorization of the user equipment; and Security App: performing Access Stratum security management.

Except for the AF App, all the other control applications (i.e. CM, MM, FM, etc.) are hereby referred as Network Functions (NF). In case of implementation according to the NFV paradigm, the initial instantiation of the C-plane architecture is assumed to be performed by orchestration and management mechanisms, for example AFs and NFs can be dynamically deployed within the access networks and core networks.

At the initial instantiation multiple instantiations of the same control application might be generated, according to requirements driving the instantiation process. For instance, multiple slices may be instantiated, as proposed in the current application.

The U-plane architecture may be determined by C-plane procedures at end device initial attachment or Service Request and instantiated in the underlying infrastructure. Alike the C-plane functions, U-plane functions are hereby referred as Network Functions (NF).

An E2E slice (composition of function) may consist of a set of logical AFs, NFs and related logical interconnections, building both the C-plane and U-plane to support the communication service for a particular cluster of services having homogenous functional and performance requirements.

FIG. 3 illustrates an example of E2E slices, in which two E2E slices are enabled in the mobile networks. For instance, Slice 1 includes Access Function AF1, Network Functions NF1, NF2 and NF3. Slice 2 includes Access Function AF2, Network Functions NF4 and NF5. NF5 may be implemented as an SDN control application. Each slice can be associated by a unique identifier (ID), such slice ID can be predefined for instance, by the network operators, or it can be dynamically assigned on demand.

The C-plane procedures can be slice-dependent. For instance, C-plane procedure may have optional parts that are performed only for some slices, for instance Machine Type Communication (MTC) type end devices without mobility (e.g. smart meters), MTC type end devices with mobility (e.g. sensors on vehicles).

Given the same C-plane procedures, the logical functions may be slice-dependent, so that some functions are dedicated to some slices, for instance group location update (e.g. for sensors) and individual location update (e.g. for smart phones).

Resources allocated in the U-plane may depend on the slice; e.g. a high performance transport network may be reserved for a given slice.

Figure 4:
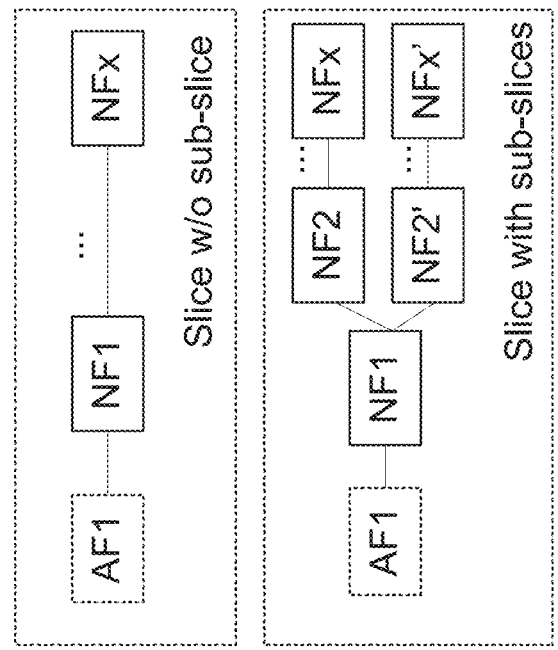
FIG. 4 schematically shows the different slice composition approaches.

An E2E slice may contain sub-slices, for instance as shown in FIG. 4. The reason to enable sub-slice selection is because some slices may share one and the same function, for example not all the slices may require different air-interface settings and share the same settings. A group of slices may share the same air-interface (e.g. all MTC type end devices attach to MTC E2E slice 1, meaning, access via AF1), and further core network function distensions are done via sub-slice selection (e.g. MTC slice 1 may contain two sub-slice as shown in FIG. 4, sub-slice 1 and sub-slice 2, which are distinguished at NF1, where sub-slice 1 contains NFs without mobility support, sub-slice 2 contains NFs with mobility support). Once an end device attaches to a slice, more information may be retrieved from the subscriber database (e.g. HSS) for this end device. Therefore, the existence of sub-slice does not impact slice information broadcasting, because sub-slice information is only obtained once a device has been attached to the network. Such sub-slice information can be used to provide fine-grained network function support, for instance, with or without mobility support, offline or online charging, etc. Hence, it is possible to enable sub-slice selection on a certain NF.

E2E slices may be service-tailored. They may be constructed especially to meet 5G service requirements. There may exist one common slice (or defaulted slice), which does not guarantee 5G specific requirements for instance in terms of latency, reliability, etc., but it can be used by all end devices with the right credential, for instance:

end devices do not discover the desired E2E slice to attach;

end devices are failed to attach to the desired E2E slice; and end devices require more information to attach to the desired E2E slice, which could be obtained from the network after they attach to the defaulted slice.

Figure 5:
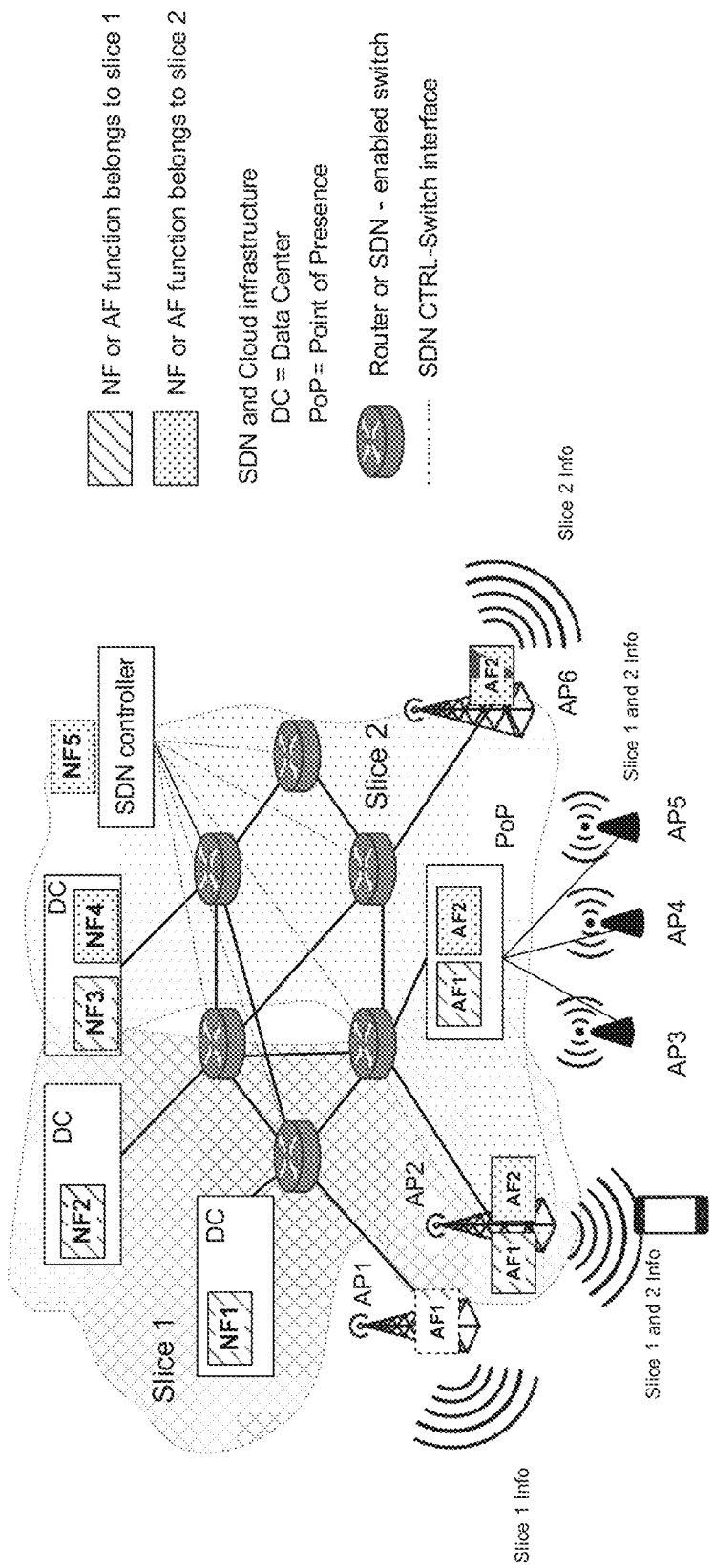
FIG. 5 schematically shows slice information advertisement.

FIG. 5 schematically describes the scheme of slice advertisement. Slice information may be included in the System Information (SI). Such information may particularly be broadcasted by APs within mobile networks, and may be used by end devices to tune their radio interfaces and access the cellular network. APs may broadcast network slice related information that end devices can use to connect to the most suitable slice. For a certain AP, it may not support all the slices that are supported by the mobile networks. Therefore, an AP may only include the information about the slices that can be supported by this AP. The slice information can be configured into the AF that is responsible to generate SI dynamically (e.g. AF is programmable) or fixed (e.g. AF is integrated with the AP).

An E2E slice information advertisement example is illustrated in FIG. 5. As shown in this figure, AP1 may only broadcast SI including Slice 1's information. AP2 may broadcast SI including Slice 1 and Slice 2's information. AP3, 4 and 5 may broadcast SI including Slice 1 and Slice 2's information. AP 6 may only broadcast SI including Slice 2's information.

Figure 6:
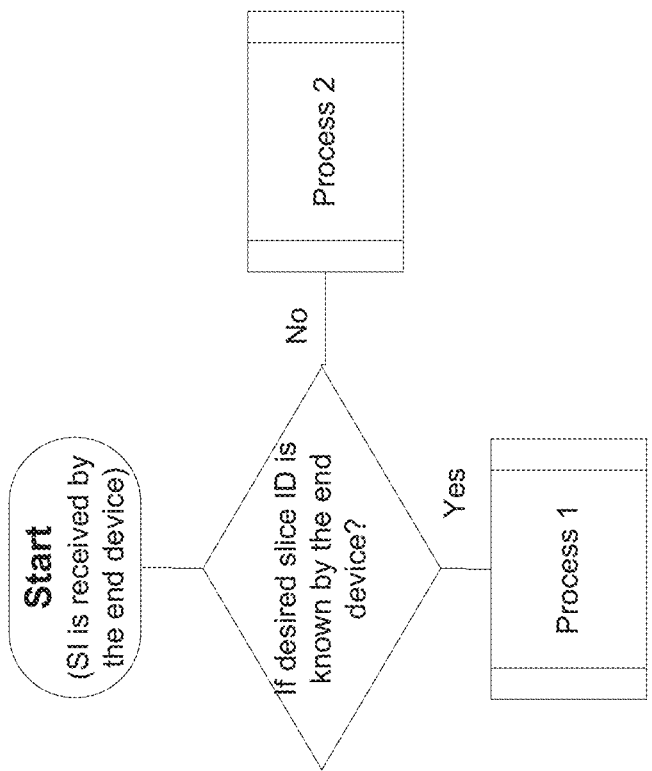
FIG. 6 schematically shows the slice selection process triggered at the terminal equipment side.

FIG. 6 shows the slice selection process triggered at the end device side. In order to access to a mobile network, the following procedures are performed at the end device side:

(1) Frequency Search;
(2) Cell Search;
(3) Cell Selection;
(4) System Information (SI) decoding;
(5) Slice(s) selection;
(6) Initial radio access; and
(7) Attachment procedure.

The steps from (1) to (3) may be typical steps followed in existing cellular systems. There may be two types of information which can be obtained via SI decoding in step (4): a) slice related information and b) corresponding radio access information for supported slices.

Slice information may contain but not limited to slice ID, E2E slice performance and functional information. Radio access information may contain but not limited to: for each slice, a specific RAT setting (e.g. waveform, coding schemes, modulation, specific AF or NF supported by the slice, etc.) may be required in order to obtain further slice information or attach to certain slice(s).

The performance information mentioned above could be for instance guaranteed E2E latency, minimum or maximum throughput. The functional information refers to the C-plane and/or U-plane function related information, which may indicate which type of functions supported by the slice, for instance, with or without mobility support, etc.

In step (5), slice selection is performed at the end device side, which is done based on the end device capability and the slice information broadcasted by the AP. If specific configuration for radio access is required by the slice (such information may be included in the SI), and the end device is capable to do so, the end device re-configures its own air interface according to the RAT settings to be able to read additional SI broadcasted from the selected slice(s). Based on the information obtained from the above mentioned SI, the end device may select or reconfigure its radio access settings (e.g. waveforms, modulation and coding schemes, etc.) prior to the attachment to the selected slice.

According to the devices' capability, they can be classified in two categories: single-slice capable end device or multi-slice capable end device. A single-slice capable end device is capable to connect (Access Capabilities) and attach (Non Access Capabilities) to one specific E2E slice only, e.g. sensors that can only connect to an MTC slice are single-slice capable end devices. A multi-slice capable end device is capable to connect (Access Capabilities) and attach (Non Access Capabilities) to multiple slices, e.g. smart phone and tablet type end devices can access to the slice for best effort services (e.g. mobile broadband) as well as ultra-high reliability and low latency slice for life critical type of services (e.g. eHealth, V2X, etc.). A multi-slice capable end device may select one or a set of slices to attach to, in such case, step (6) and (7) can be executed simultaneously or sequentially for each slice.

A high-level end device behaviour happened during step (5) is shown in FIG. 6. This behaviour depends on the received broadcasted system information from the APs and also the end device capability, and two scenarios are considered as follows:

If an end device contains information (e.g. slice ID) about a slice that it is desired to attach to, Process 1 is triggered to obtain appropriated radio access information in order to attach to the specific slice. For certain devices, e.g. dumb devices with low capability, it may be easier for such devices performing slice selection by pre-configuring the desired slice information in the device (e.g. coded in the device hardware). Such desired slice information may be also obtained from previous attachment and stored in the end device.

If the end device does not contain any slice information (e.g. slice ID), Process 2 is triggered to execute the process to decide which slice is suitable to attach to using available E2E slice performance and functional information and obtain corresponding radio access information from system information in order to attach to the selected slice.

If the desired slice is not supported by the AP and an end device is capable to use other slices, this end device may move from Process 1 to Process 2.

In step (6), radio access process is initialized at end devices in order to attach to the selected slice. Different mechanisms or RAT settings for radio access may be required to attach to different slice(s).

In step (7), attachment procedure is triggered by the end device sending Attach Request to a certain slice, and a network function within the slice may decide to accept, reject or redirect the request according to the end device' credential, resource availability and request redirection support.

The steps from (1) to (7) are not only used during the initial access (i.e. power on of an end device). For instance, after an end device has been attached to a network, it may discover new slices when it performs cell re-selection within the same network.

Figure 7:
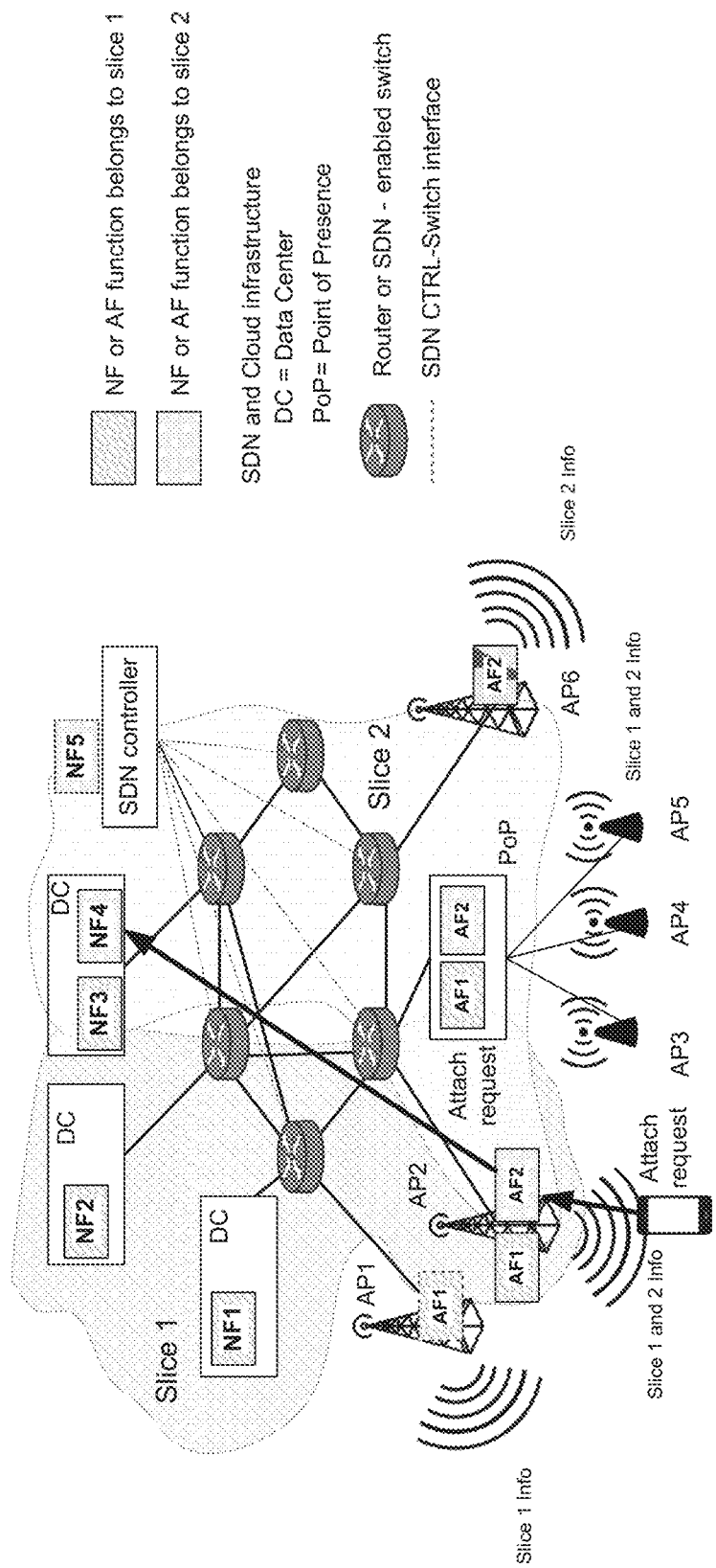
FIG. 7 schematically shows terminal equipment based slice selection.

FIG. 7 shows an example of end device based slice selection, in which the end device decodes the SI broadcast by AP2, and obtains the Slice 2 information from the decoded SI. It selects Slice 2 to attach. The end device accesses Slice 2 via AP2. The end device sends the Attach Request message to AF2, which forwards the message to NF4. Such NF can be for example responsible to authenticate end device's credential and perform attachment procedure.

The received Attach Request message at the NF triggers the execution of the attachment procedure as required by the related slice, which may involve other NFs belonging to the same slice. The NF that receives the request first checks if the end device has the credential for attachment, and if the slice has sufficient resource to accept the attachment request. If both conditions are satisfied, the above mentioned NF shall send an Attach Accept message to the related AF, and the AF shall complete the attachment procedure on the access interface. If at least one of the above mentioned conditions is not satisfied, the end device cannot attach to this slice and the related NF shall send an Attach Reject message to the related AF and the AF shall reject the Attach procedure on the access interface.

Slice redirection function is used to redirect the Attach Request message to the NF of an alternative E2E slice the end device should attach to, rather than the end device selected E2E slice. If slice redirection function is supported by the NF, instead of sending an Attach Reject message to the related AF, the NF shall initiate the slice redirection procedure. If the end device has the credential to attach to the alternative E2E slice and if resources are available in the alternative E2E slice, the NF of the alternative E2E slice shall send an Attach Accept message to the NF of the end device selected end to end slice. The NF and the AF of the end device selected E2E slice shall complete the Attach procedure on the access interface, by sending an Attach Redirect message to the end device, forcing it to reconnect to the alternative E2E slice that it should attach to.

Slice ID may be specified in the Attach Request message, based on which, the CN may use different procedures and/or provide different QoS per slice.

Figure 8:
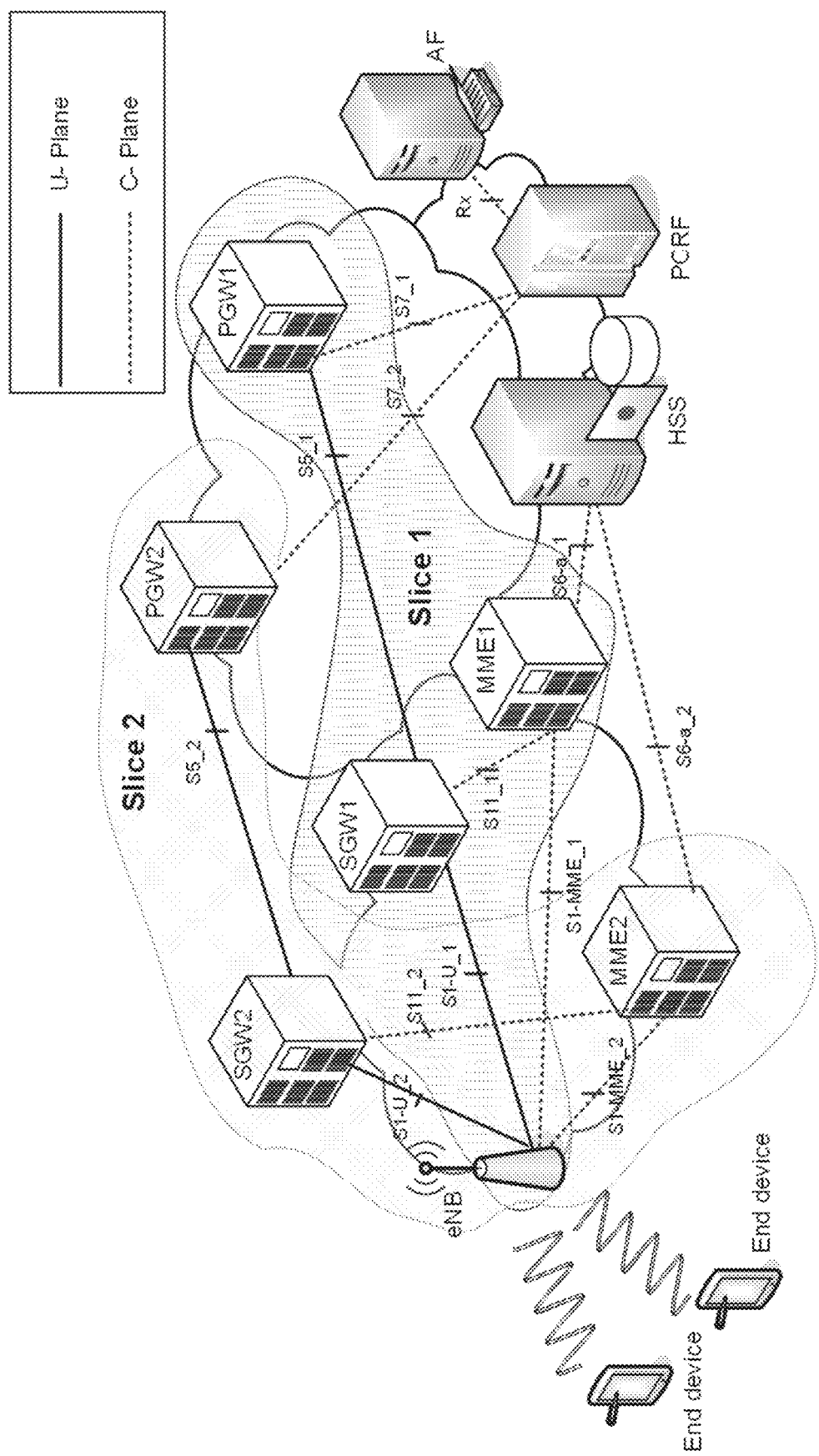
FIG. 8 schematically shows implementation of slices in a telecommunication network.

FIG. 8 shows a possible implementation of E2E slices in 4G LTE networks. As shown in the figure, two E2E slices are defined, i.e. E2E slice 1 and E2E slice 2. Each E2E slice is made by a Radio Access Network (RAN) slice and (Core Network) CN slice. RAN Slice is defined at eNB, via a customization of LTE Um interface. The eNB supports slice 1 and slice 2 at the same time. CN slice is defined by C-plane (i.e. MME) and U-plane (i.e. SDW, PGW) network elements. The CN slice for Slice 1 consists of MME1, SGW1 and PGW1. In comparison, the CN slice for slice 2 consists of MME2, SGW2 and PGW2. PCRF and HSS are assumed to be common to all slices. This assumption is related to this specific embodiment only. Both HSS and PCRF could be slice-specific.

To support RAN slices, a single eNB may implement several Um interfaces, each one building an AF function associated to an E2E slice. The common part to all AFs is the Broadcast Channel (BCH) transport channel and the related Broadcast Control Channel (BCCH) logical channel, used to broadcast system information for slices advertisement.

Figure 9:
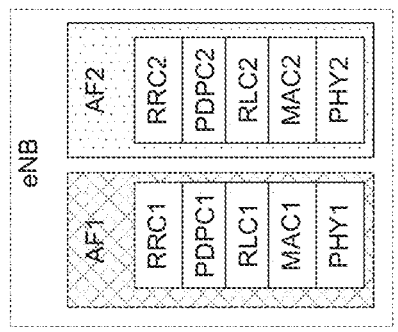
FIG. 9 schematically shows different parameterizations of a telecommunication network.

FIG. 9 shows two different parameterizations of LTE Um protocol stack as the example. However, the stack of each RAN slice can be completely re-designed and re-engineered.

Figure 10:
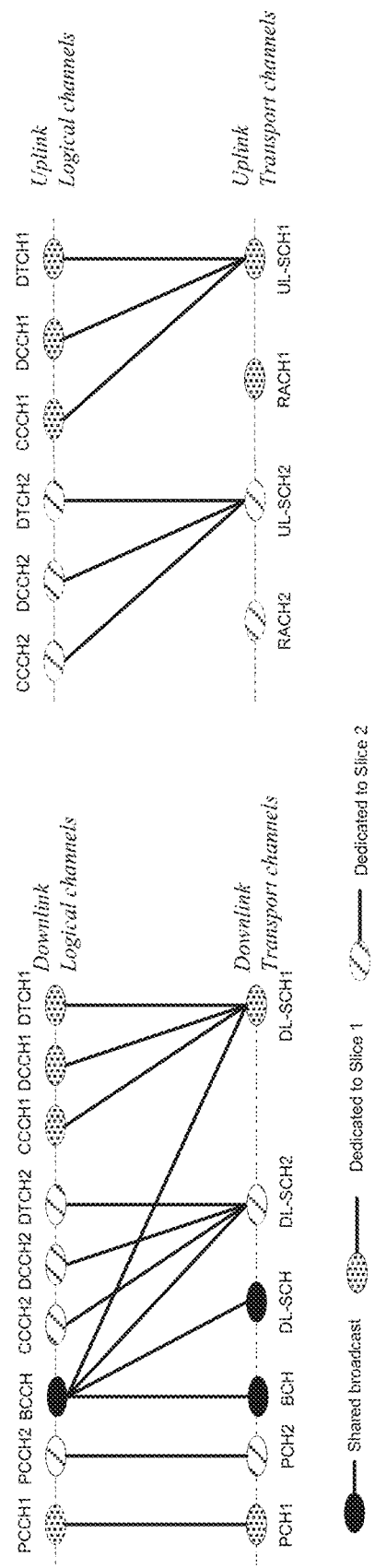
FIG. 10 schematically shows refined downlink and uplink logical transport channels.

FIG. 10 shows downlink and uplink logical and transport channels. Different downlink logical channels and uplink logical channels are defined for slice 1 and 2 as illustrated in FIG. 10. For instance, MIB and is transmitted using BCH, SIBs are transmitted using DL-SCH. A device may obtain scheduling information about a specific SIB which contains slice information. For instance as shown in FIG. 10, if an end device wants to attach to slice 1, it can use DL-SCH1 to receive the SIB that contains slice 1 information and it can use UL-SCH1 for uplink data transfer. In comparison, if an end device wants to attach to slice 2, it can use DL-SCH2 to receive the SIB that contains slice's 2 information and it can use USCH2 for uplink data transfer.

Figure 11:
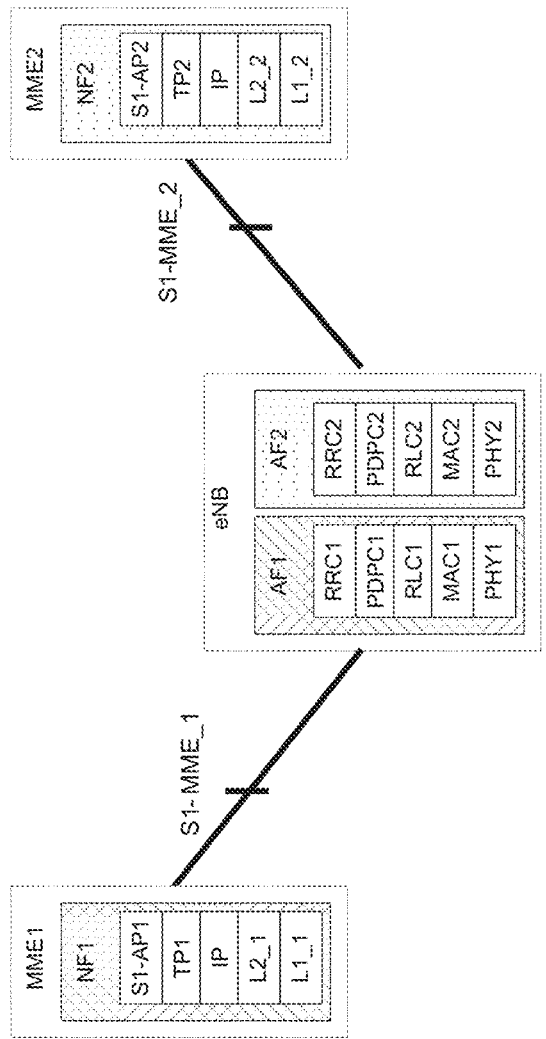
FIG. 11 schematically shows different slices of a telecommunication network.

The eNB can be connected to multiple (different) MMEs that belong to different slices via multiple (different) S1-MME interfaces as shown in FIG. 11. Different MMEs represent different C-plane NFs composing the C-plane of different slices. FIG. 11 shows two different parameterization of S1-MME protocol stack as the example. However, the stack of each Core Network slice can be completely re-designed and re-engineered.

Figure 12:
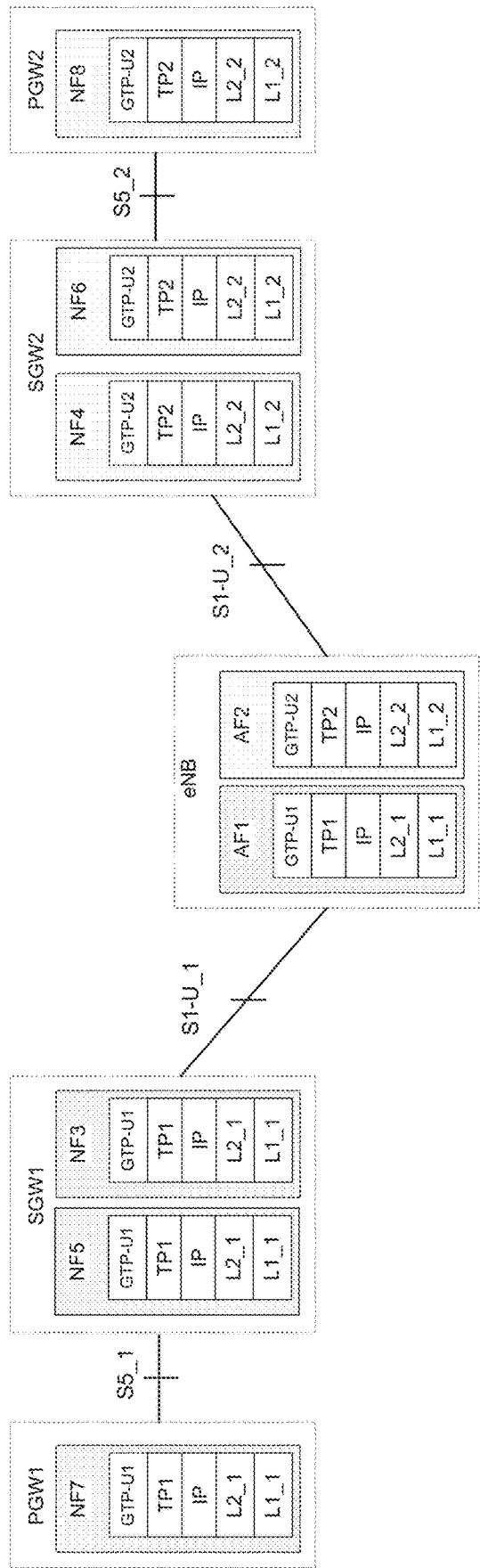
FIG. 12 schematically shows different slices of a telecommunication network.

Multiple S1 interfaces connect the eNB to multiple SGWs (and consequently PGWs). The multiple SGWs/PGWs represent multiple U-plane NFs composing the U-plane of multiple slices. FIG. 12 shows two different parameterisation of S1-U and S5 protocol stacks, but the stack of each Core Network slice may be completely re-designed and re-engineered.

Figure 13:
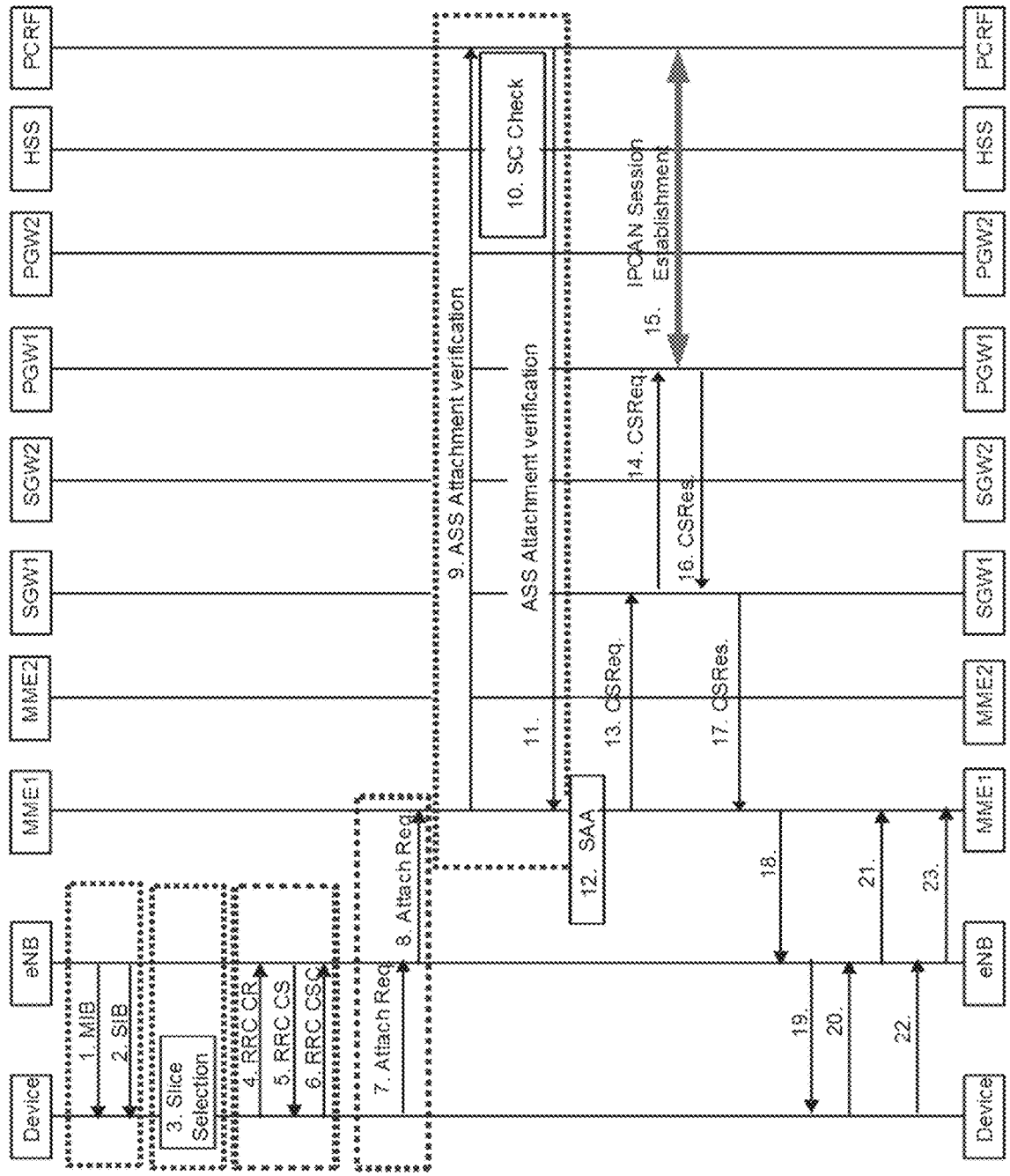
FIG. 13 schematically shows an overview of the slice attachment procedure.

With reference to FIG. 13, an exemplary embodiment of slice advertisement based on enhanced SIB is provided.

In 4G LTE system, the system information elements are broadcast in System Information Blocks (SIBs), which is organised as a tree structure. According to the definition from 3GPP, a Master Information Block (MIB) gives references and scheduling information to a number of SIBs in a cell. The SIBs contain the actual system information. The MIB may optionally also contain reference and scheduling information to one, two or three scheduling blocks, which give references and scheduling information for additional SIBs. Scheduling information for a system information block may only be included in either the MIB or one of the scheduling blocks. MIB, SIB type 1 and 2 are mandatory, which provide the minimum required information to access to the RAN. Other SIBs and scheduling blocks are optional.

In order to enable E2E slice, this embodiment proposes to use eNBs to broadcast information encoded in the SIBs. This information identifies one or more E2E slices that end devices may attach to. Therefore, end devices can directly attach to the appropriate network slice(s) during the Radio Resource Control (RRC) attach procedure. This mechanism enables the network slices that begin from the radio access network and end in the core network, hence spanning the whole E2E system.

In this embodiment, the MIB is kept the same as the 4G LTE system (MIB can also be extended in order to contain slice related information), and the following SIB modifications are required in order to support E2E slices. SIB1 is extended with available slices' information, for instance slice ID and scheduling information for the other SIBs that could be used to obtain further information for radio access in order to perform slice attachment procedure. For each slice, a (new) SIB is used to describe the necessary RAT settings (e.g. waveforms, coding schemes, modulation, etc.) enabling the access of uplink channels. Common system information which can be applied for all slices will be kept in the conventional SIBs without modification. For instance, if M E2E slices are supported in the system, SIB1 contains the slice ID and scheduling information that is used to decode SIB2.*i* (where i=1 . . . M). SIB2.*i* is used to contain RAT settings which are used by end devices in order to perform radio access to slice i. All the SIB2.*i* (where i=1 . . . M) are transmitted on Physical Downlink Shared Channels (PDSCHs).

Within this preferred embodiment of the invention, the content of SIB2.*i* can be implemented in different options.

Option 1 can be used if the slice information can be pre-configured in the end device's SIM or obtained from previous attachment. Such slice information may contain for instance slice ID, E2E slice performance information and functional information, which can be used for the end device to select a slice (or a subset of slices) to attach among a set of supported slices by the AP. In such a scenario, for each E2E slice (e.g. slice i), a new SIB may be specified (e.g. SIB2.*i*) to include RAN information (required RAT settings in order to perform radio access to slice i, e.g. waveform, modulation and coding scheme, etc.). For each slice ID, the scheduling information to receive and decode SIB2.*i* may be specified.

Option 2 can be used if there is no pre-stored slice information on UE. In this case, all the information about available slices is broadcasted via the AP, based on which the end device selects a suitable slice (or a subset of slices) to attach. There are two possible implementations for option 2:

Implementation 1: Each SIB2.*i* includes slice information and RAN information for access. For this implementation, end devices need to decode all the SIB2.*i* (for i=1 . . . M) in order to select one slice (or a subset of slices) to attach.

Implementation 2: An extra SIB is used, e.g. SIB2.*o*, which contains an overview of all the supported slices: slice information and scheduling information for SIB2.$i$ (where $i=1\ldots M$). End devices may select a slice (e.g. SIB2.$i$) (or a subset of slices) to attach only based on slice information. Based on the scheduling information recorded in SIB2.$o$, end devices will further decode SIB2.$i$ to obtain RAN information. End devices do not need to decode all the SIB2.$i$ (for $i=1\ldots M$).

An example list of slice information is shown in Table 1.

TABLE 1 slice information example, performance description and functional description

| Info type | Info | Possible values |
|---|---|---|
| Performance | Max e2e latency | 1 ms, 5 ms, 10 ms, 50 ms, . . . |
| Performance | Min throughput | 0, 10 Mbps, 100 Mbps, 1 Gbps, 10 Gbps, . . . . |
| Performance | Max throughput | 10 Mbps, 100 Mbps, 1 Gbps, 10 Gbps, . . . |
| Performance | Guaranteed performance reliability | 99%, 99.9%, 99.99%, 99.999%, . . . |
| Performance | Guarantee network availability | 99%, 99.9%, 99.99%, 99.999%, . . . |
| Functional | Supported mobility | Supported/not supported, nomadic/hard handover/soft handover . . . |

In order to describe the slice selection and attachment, reference is made again to FIG. 6. In this figure, a flow chart describing the end device slice selection and attachment is shown, where the behavior of an end device is modeled. This behaviour depends on the broadcasted information from the APs.

If an end device contains information about a slice or slices that it is authorized to attach to, Process 1 is triggered. Such slice information could be pre-configured in end device's hardware (e.g. SIM card), or it could be obtained from previous attachment and stored in the end device. If the end device does not contain any slice information, Process 2 is triggered.

The procedure for E2E slice attachment is described with reference to FIG. 13. In the following, reference is made to steps of this slice attachment process, wherein the steps are indicated in the figure with numbers 1 to 23 located above an arrow, respectively.

In steps 1 and 2, the end device receives the E2E slice information via broadcasted MIB and SIBs, which is used as the input for slice selection function performed at the end device side in step 3. The slice selection process executed in the end device in step 3 can be implemented as explained with reference to FIG. 6.

Steps 4, 5 and 6 implement the steps to establish RRC connection. In step 4, RRC Connection Request (CR) message is sent from the end device to the eNB via UL-SCH dedicated for Slice 1, which the end device plans to access after running the slice selection function. Slice ID may be included in the RRC CR message. In step 5, the information required to establish RRC connection is included in the RRC Connection Setup (CS) message, which is also sent via UL-SCH dedicated for Slice 1. In step 6, RRC Connection Setup Complete (CSC) message is sent from the end device to the eNB in step 6 via UL-SCH dedicated for Slice 1, and then the RRC connection is established.

In step 7, the end device initiates the Attach procedure by the transmission of an Attach Request to the eNB. The slice ID may be contained in the Attach Request message.

In step 8, the eNB forward the Attach Request message to the MME1.

In step 9, after the MME1 receives the Attach Request message from the eNB, it sends Authentication/Security/Slice (ASS) Attachment Verification request message to the HSS.

In step 10, the Slice Credential (SC) is done in HSS to see if the end device has sufficient credential to use Slice 1 and sends the verification results in ASS Attachment Verification Acknowledgement message to the MME1 in step 11.

The steps highlighted by the dashed box are the steps with extensions based on the proposals presented with reference to FIGS. 3 to 7 and the related description above.

If the end device is allowed to access Slice 1 as verified by the MME1 in step 12, steps 13-23 are performed as briefly described in the following:

In step 13, the Create Session Request (CSReq) message is sent from the MME1 to the SGW1, which may include Slice ID. In step 14, the Create Session Request (CSReq) message is sent from the SGW1 to the PGW1, which may include Slice ID. In step 15, the PGW1 performs an IP-CAN Session Establishment procedure with the PCRF. In step 16, the PGW1 returns Create Session Response (CSRes.) message to the SGW1, which may include Slice ID. In step 17, the SGW1 returns Create Session Response (CSRes.) message to the MME1, which may include Slice ID. In step 18, the MME1 sends the Initial Context Setup Request/Attach Accept message to the eNB, which may include Slice ID. In step 19, the eNB sends the RRC Connection Reconfiguration message and along with the Attach Accept message to the device, which may include Slice ID. In step 20, the UE sends the RRC Connection Reconfiguration Complete message to the eNB, which may include Slice ID. In step 21, the eNB sends the Initial Context Response message to the MME1, which may include Slice ID. In step 22, the UE sends a Direct Transfer message to the eNB, which includes the Attach Complete message, which may include Slice ID. In step 23, the eNB forwards the Attach Complete message to the MME1, which may include Slice ID.

FIG. 13 depicts a single slice attachment. For a multi-slice capable end device, it can attach to multiple slices via different RACHs simultaneously or sequentially. The slice ID may be included in any C-plane message to enable dynamic C-plane operations as explained with reference to FIGS. 3 and 4, in particular with reference to the Attach Request message as follows:

An NF may use different procedures and/or provide different QoS depending on the slice id specified in the received control plane message.

When an E2E slice contains sub-slices, the slice ID specified in the received control plane message may be used by an NF to select sub-slices. For instance, slice 1 and 2 may share the same MME (e.g. MME1), after an Attach Request from an end device is accepted by MME1, it may obtain more information about this end device from HSS, therefore based on the extra information, MME1 may select either SGW 1 or SGW 2 to process the traffic from this end device.

Summing up, this specification describes system architecture that is complaint with 5G network technique research. One advantages of this description is to enable E2E slice for mobile network and provide fast slice attachment with reduced signalling overhead.

The approach described herein may be summed up in other words as follows:

A system and methods are provided to enable end-to-end (E2E) network slices selection and attachment at end devices that comprise:
a. Advertising slice information to end devices, which affects the radio interface on the Access Point (AP) and Access Functions (AFs) which may or may not be located at AP;
b. Selecting, by end devices, one or multiple slices;
c. Supporting, by a radio access network, one or multiple slices, which allows end devices to access and attach to one or multiple slices directly;
d. Requesting, by end devices, attachment to one or multiple slices; and
e. Processing the attach requests from the end devices and complete the attachment procedure, which is performed by the related Core Network Functions (NFs).

In particular, the step described under lit. a above may be based on the extended system information broadcasted by AP to advertise E2E slices information and corresponding radio accesses related information. E2E slice information may include slice E2E performance guarantees, control plane and user plane functional information, and slice ID.

In particular, the step described under lit. b above comprises: using, by an end device for slice selection the E2E slice information and radio access related information received from system information broadcasting.

In particular, the step described under lit. c above comprises that AFs from different slices can serve requests from end devices requests to attach to different slices. Such AFs may be co-located at the same AP, or outside of APs. The step described under lit. c above may comprise that the telecommunication network may support default slice and/or multiple dedicated slices. If the desired slice(s) is not supported by the AP, an end device is allowed to use the default slice for default services that can obtained from the system.

In particular, the step described under lit. d above comprises that the telecommunication network may support end devices that may attach to one or multiple slices, as well as end devices that may only attach to a single slice.

In particular, the step described under lit. e above comprises that there is capability for a NF from a certain network slice to decide to accept/reject/redirect the request according to the end device credential, resource availability and request redirection support. NFs within one slice may include slice ID in the signaling messages when they communicate with the other NFs within the same slice.

What is claimed is:

1. A network device, comprising:
a processor; and
a non-transitory computer-readable storage medium storing a program to be executed by the processor, the program including instructions for:
determining a plurality of compositions of functions available in a telecommunication network to which the network device belongs, based on a set of functions available in the telecommunication network, wherein the set of functions comprises a plurality of access functions and a plurality of network functions, and wherein each composition of the plurality of compositions of functions is different from one another, and each composition is uniquely identified by an identifier;
providing for a terminal equipment, which is in the telecommunication network, a composition of functions from the plurality of compositions of functions available in the telecommunication network, based on an access function from the plurality of access functions and a network function from the plurality of network functions applicable to the terminal equipment; and
making available, to the terminal equipment, information of the composition of functions provided for the terminal equipment, wherein the information comprises an identifier of each composition of functions provided for the terminal equipment;
receiving a request from the terminal equipment to use the composition of functions provided for the terminal equipment; and
responding to the request from the terminal equipment.

2. The network device of claim 1, wherein the program further includes instructions for selecting a radio access technology (RAT) for the composition of functions provided for the terminal equipment, by selecting:
a modulation scheme from a plurality of modulation schemes supported by a plurality of air interfaces of the telecommunication network;
a coding scheme from a plurality of coding schemes supported by the plurality of air interfaces of the telecommunication network;
a frequency from a plurality of frequencies supported by the plurality of air interfaces of the telecommunication network; or
a waveform for data signal transmission from a plurality of waveforms for data signal transmission supported by the plurality of air interfaces of the telecommunication network; and
wherein the information, which is made available to the terminal equipment, further comprises information relating to the modulation scheme, the coding scheme, the frequency or the waveform for data signal transmission that is selected for the composition of functions provided for the terminal equipment.

3. The network device of claim 1, wherein the instructions for responding to the request comprise instructions for accepting the request for the composition of functions, rejecting the request for the composition of functions, or redirecting the request to another composition of functions.

4. The network device of claim 3, wherein the instructions for responding to the request comprise instructions for determining whether the composition of functions, which is requested, has sufficient resources to establish a connection to the terminal equipment; and
wherein the instructions for redirecting the request to another composition of functions comprise instructions for sending to the terminal equipment a unique identifier of the other composition of functions when it is determined that there are insufficient resources to establish the connection to the terminal equipment for the composition of functions that is requested.

5. The network device of claim 1, wherein the plurality of access functions in the set of functions comprises:
physical access of the terminal equipment to a first node and a second network node; or
radio connection management; and
wherein the plurality of network functions in the set of functions comprises:
forwarding path management;
address resolution;
address allocation;
tracking area management;
paging management;

handover management;
relaying;
data packet forwarding;
authentication of the terminal equipment;
authorization of the terminal equipment; or
access stratum security management.

6. The network device of claim 1, wherein a composition of functions comprises the plurality of access functions and the plurality of network functions needed for providing a predefined service.

7. The network device of claim 1, wherein the telecommunication network further comprises a plurality of network nodes capable of computing, data storage or packet forwarding, and wherein the plurality of network nodes are configured to virtualize each function in the set of functions that are available in the telecommunication network.

8. The network device of claim 1, wherein the instructions for providing, for the terminal equipment, the plurality of compositions of functions comprise instructions for determining which are allowed to be used by the terminal equipment, amongst the plurality of compositions of functions that are available in the telecommunication network.

9. The network device of claim 1, wherein the instructions for making available, to the terminal equipment, the information of the composition of functions provided for the terminal equipment comprises instructions for broadcasting the information in an air interface.

10. The network device of claim 1, wherein the instructions for determining the plurality of compositions of functions available in the telecommunication network comprise instructions for providing a basic composition of functions which is allowed to be used by the terminal equipment and all other terminal equipments in the telecommunication network with the network device.

11. A terminal equipment, comprising:
a processor; and
a non-transitory computer-readable storage medium storing a program to be executed by the processor, the program including instructions for:
establishing a communicative connection to a telecommunication network, wherein a set of functions, which are available in the telecommunication network, comprises a plurality of access functions and a plurality of network functions;
receiving, from a network device in the telecommunication network with the terminal equipment, a unique identifier of a composition of functions provided for the terminal equipment, out of a plurality of compositions of functions that are determined based on the set of functions available in the telecommunication network, wherein each composition of the plurality of compositions of functions is different from one another, and each composition is uniquely identified by an identifier, wherein the composition of functions provided for the terminal equipment is based on an access function from the plurality of access functions and a network function from the plurality of network functions applicable to the terminal equipment, and wherein the unique identifier is comprised in information, which is made available by the network device to the terminal equipment, of the composition of functions provided for the terminal equipment;
selecting which of the composition of functions to use from the composition of functions provided by the network device;
sending a request to the network device to use the composition of functions that is selected, wherein the request comprises a unique identifier of the composition of functions that is selected; and
receiving a response from the network device to the request.

12. The terminal equipment of claim 11, wherein the instructions for selecting comprise instructions for making a selection based on a service requirement of an application running on the terminal equipment, or based on information preconfigured on the terminal equipment.

13. The terminal equipment of claim 11, wherein the program further comprises instructions for attaching to more than one composition of functions of a plurality of composition of functions provided for the terminal equipment, by sending respective attachment requests to the more than one compositions of functions.

14. The terminal equipment of claim 11, wherein, when the response comprises a redirection of the request to another composition of functions, the program comprises instructions for attaching to the other composition of functions indicated in the redirection.

15. A method, comprising:
receiving, by a terminal equipment, a plurality of identifiers of a plurality of compositions of functions allowed to the terminal equipment in a telecommunication network, wherein the plurality of compositions of functions is comprised in a plurality of compositions of functions that is available in the telecommunication network;
selecting, by the terminal equipment, from the plurality of compositions of functions allowed to the terminal equipment, a composition of functions;
requesting, by the terminal equipment, to use the composition of functions that is selected, by referring to an identifier that is unique to the composition of functions that is selected; and
receiving, by the terminal equipment, a response from a network device to a request to use the composition of functions that is selected;
wherein the telecommunication network is implemented on a software defined network (SDN);
wherein the telecommunication network is capable of providing a plurality of compositions of functions that are different from one another;
wherein each composition of the plurality of compositions of functions is identified by a unique identifier; and
wherein each composition of the plurality of compositions of functions comprises an access function from a plurality of access functions and a network function from a plurality of network functions available in the telecommunication network.

16. The method of claim 15, wherein selecting, by the terminal equipment, the composition of functions comprises making a selection based on a service requirement of an application running on the terminal equipment, or based on information preconfigured on the terminal equipment.

17. The method of claim 15, further comprising:
attaching to a composition of functions that the terminal equipment is able to use, according to the response received from the network device.

18. The method of claim 15, wherein selecting comprises selecting more than one composition of functions of the plurality of compositions of functions; and wherein the method further comprises:

attaching to the more than one composition of functions that is selected, by sending respective attachment requests to the more than one compositions of functions.

19. The method of claim 15, wherein, when the response comprises a redirection to another composition of functions other than the composition of functions that is requested, the method further comprises attaching to the other composition of functions indicated in the redirection.

20. The method of claim 15, wherein receiving the plurality of identifiers of the plurality of compositions of functions allowed to the terminal equipment, comprise receiving the plurality of identifiers that are broadcast by network device in an air interface.

\* \* \* \* \*